(12) United States Patent
Keller et al.

(10) Patent No.: US 11,996,874 B1
(45) Date of Patent: May 28, 2024

(54) SYSTEM AND METHOD OF DETERMINING INTERFERING SIGNAL PARAMETERS

(71) Applicant: L3Harris Technologies, Inc., Melbourne, FL (US)

(72) Inventors: David R. Keller, Herriman, UT (US); L. Andrew Gibson, Jr., Riverton, UT (US); Alexander Kimani, Grantsville, UT (US); Lance Lindsay, Woods Cross, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 23 days.

(21) Appl. No.: 18/154,288

(22) Filed: Jan. 13, 2023

(51) Int. Cl.
*H04B 1/10* (2006.01)
*H04B 1/12* (2006.01)

(52) U.S. Cl.
CPC ............ *H04B 1/1027* (2013.01); *H04B 1/12* (2013.01)

(58) Field of Classification Search
CPC ................................ H04B 1/1027; H04B 1/12
See application file for complete search history.

(56) References Cited

U.S. PATENT DOCUMENTS

| | | |
|---|---|---|
| 6,188,718 B1 | 2/2001 | Gitlin et al. |
| 6,804,309 B1 | 10/2004 | Morelos-Zaragoza |
| 7,567,635 B2 | 7/2009 | Scheim et al. |
| 8,433,015 B2 | 4/2013 | Downey et al. |
| 8,929,492 B2 | 1/2015 | Downey et al. |
| 9,130,624 B2 * | 9/2015 | Daughtridge ........ H04B 1/0475 |
| 9,197,360 B2 | 11/2015 | Wyckoff |
| 9,197,461 B1 * | 11/2015 | Sun ...................... H04B 7/024 |

(Continued)

FOREIGN PATENT DOCUMENTS

| | | |
|---|---|---|
| CN | 104507106 | 4/2015 |
| CN | 103532894 | 4/2017 |

OTHER PUBLICATIONS

Feng et al., "An Accurate Modulation Recognition Method of QPSK Signal," Advanced Techniques for Computational and Information Sciences, Mathematical Problems in Engineering, vol. 2015, Article ID 516081, 7 pages (2015).

(Continued)

*Primary Examiner* — Dac V Ha
(74) *Attorney, Agent, or Firm* — Fox Rothschild LLP; Carol Thorstad-Forsyth

(57) ABSTRACT

Systems and methods comprising: receiving a signal (S) having a first interfering signal component (FISC); generating a replicated SOI (RSOI); and iteratively performing a process to obtain residual errors for FISC. The process involves: modifying an amplitude of RSOI; obtaining a reference signal (RS) by removing RSOI with the modified amplitude from S; analyzing frequency of RS to obtain an estimated carrier frequency and an estimated symbol rate for FISC; generating a remaining signal by removing, from FRS, a signal having the estimated carrier frequency and symbol rate; and determining a residual error of the remaining signal. Parameters for FISC are then set equal to the estimated carrier frequency and symbol rate that are associated with a lowest residual error. The parameters may be further refined in accordance with another process which involves iteratively modifying a symbol rate of FISC. Yet another process may be performed to determine filter parameters.

18 Claims, 15 Drawing Sheets

(56) References Cited

U.S. PATENT DOCUMENTS

| | | | |
|---|---|---|---|
| 9,391,654 B2 | 7/2016 | Wyckoff et al. | |
| 9,537,521 B2 | 1/2017 | Downey et al. | |
| 9,537,689 B2 | 1/2017 | Zhou et al. | |
| 9,794,092 B1 | 10/2017 | Isautier et al. | |
| 9,967,021 B2 * | 5/2018 | Potter | H04B 1/109 |
| 2004/0062317 A1 * | 4/2004 | Uesugi | H04L 27/2647 |
| | | | 375/E1.02 |
| 2005/0141628 A1 | 6/2005 | Cheng | |
| 2005/0213556 A1 | 9/2005 | Wax et al. | |
| 2006/0245509 A1 | 11/2006 | Khan et al. | |
| 2009/0257477 A1 | 10/2009 | Khayrallah et al. | |
| 2012/0189083 A1 | 7/2012 | Reial | |
| 2014/0044107 A1 | 2/2014 | Jacob | |
| 2014/0198688 A1 | 7/2014 | Li et al. | |
| 2014/0334579 A1 | 11/2014 | Lincoln et al. | |
| 2015/0188573 A1 | 7/2015 | Lorca Hernando | |
| 2015/0222391 A1 | 8/2015 | Webster et al. | |
| 2016/0315754 A1 | 10/2016 | Wu et al. | |

OTHER PUBLICATIONS

Hazza et al., "An Overview of Feature-Based Methods for Digital Modulation Classification," 2013 1st International Conference on Communications, Signal Processing, and their Applications (ICCSPA) 6 pages (2013).

Ramkumar, "Automatic modulation classification for cognitive radios using cyclic feature detection," IEEE Circuits and Systems Magazine, 9(2), pp. 27-45 (2009).

Young Jin Chun et al, "Log-likelihood-ratio ordered successive interference cancellation in multi-user, multi-mode MIMO systems," IEEE Communications Letters, 11(11), pp. 837-839 (2008).

* cited by examiner

SYSTEM AND METHOD OF DETERMINING INTERFERING SIGNAL PARAMETERS

BACKGROUND

Statement of the Technical Field

The present document concerns communication systems. More specifically, the present document concerns systems and methods for determining interfering signal parameters.

Description of the Related Art

There are many communication devices known in the art. Such communication devices include, but are not limited to, satellite communication devices and/or radios. The communication devices may experience interference resulting from other communication signals. This interference can degrade performance of the communication devices or the detection of communication signals.

SUMMARY

This document concerns systems and methods for mitigating the effect of interference in a receiver. The methods comprise: receiving a signal having a first interfering signal component; generating a replicated signal of interest using known parameters; and iteratively performing first stage operations to obtain first residual errors for the first interfering signal component. The first stage operations comprise: modifying an amplitude of the replicated signal of interest; obtaining a first reference signal by removing the replicated signal of interest with the modified amplitude from the received signal and optionally estimated interfering signal(s) generated using initial gross parameters for second interfering signal component(s) of the received signal; analyzing the first reference signal to obtain an estimated carrier frequency and an estimated symbol rate for the first interfering signal component; generating a remaining signal by removing, from the first reference signal, a signal having the estimated carrier frequency and the estimated symbol rate; and determining a residual error of the remaining signal. The amplitude of the replicated signal of interest may be modified by a different amount in each iteration of the first stage operations. Refined parameters for the first interfering signal component equal to the estimated carrier frequency and the estimated symbol rate that are associated with a lowest one of the plurality of residual errors.

The first stage operations may be iteratively repeated for a second interfering signal component of the received signal. Refined parameters for the second interfering signal component may be set based on results of the first stage operations.

In those or other scenarios, the methods may also comprise obtaining a second reference signal by removing, from the received signal, the replicated signal of interest from the received signal and optionally estimated interfering signal(s) generated using initial gross parameters for second interfering signal component(s) of the received signal.

Second stage operations may then be iteratively performed to obtain second residual errors for the first interfering signal component. The second stage operations involve: generating an estimate of the first interfering signal component using the refined parameters which were previously set based on results of the first stage operations; adjusting a symbol rate of the estimate of the first interfering signal; analyzing the estimate of the first interfering signal to obtain a refined estimated carrier frequency for the first interfering signal component; generating a resulting signal by removing, from the second reference signal, a signal having the refined carrier frequency and the symbol rate; and determining a residual error of the resulting signal. The symbol rate is modified by a different amount in each iteration of the second stage operations. The refined parameters for the first interfering signal component are re-set equal to the symbol rate and the refined estimated carrier frequency that are associated with a lowest one of the second residual errors.

The second stage operations may be iteratively repeated for each second interfering signal component of the received signal. Refined parameters for the second interfering signal component(s) are set based on results of the second stage operations.

In those or other scenarios, the methods may also comprise: obtaining a third reference signal by removing, from the received signal, the replicated signal of interest and replicated interfering signal(s) generated using the refined parameters; selecting a pulse shape or filter type; and iteratively repeating third stage operations to obtain third residual errors for the first interfering signal component. The third stage operations involve: selecting a roll-off factor from a plurality of different roll-off factors; generating an estimate of the first interfering signal component using the pulse shape, the roll-off factor and the refined parameters for the first interfering signal component; and determining a residual error between the third reference signal and the estimate of the first interfering signal component. Subsequently, a next pulse shape or filter type is selected and the third stage operations are iteratively repeated using the same. Filter parameters are set based on the pulse shape and roll-off factor that are associated with a lowest one of the third residual errors.

The implementing system can comprise a processor and a non-transitory computer-readable storage medium comprising programming instructions that are configured to cause the processor to implement a method for mitigating interference. Alternatively or additionally, the implementing system may include logic circuits (e.g., subtractors, adders, multipliers, etc.), passive circuit components (e.g., resistors, capacitors, switches, delays, etc.) and/or other active circuit components (e.g., transistors, demodulators, modulators, combiners, etc.).

BRIEF DESCRIPTION OF THE DRAWINGS

This disclosure is facilitated by reference to the following drawing figures, in which like numerals represent like items throughout the figures.

DETAILED DESCRIPTION

Figure 1:
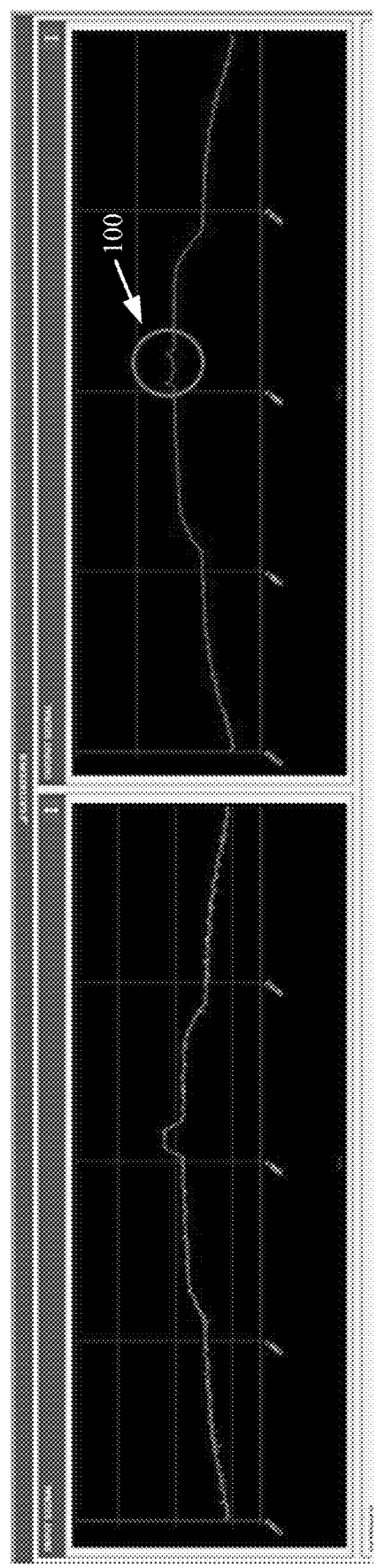
FIG. 1 is an illustration of an architecture for a conventional interference cancellation device. During operations of the conventional interference cancellation device, signals are either removed in parallel or via feedback. Non-optimal removal of the signals results from poor signal estimates of parameters such as pulse shape filter, alpha and modulation type. Non-optimal removal is seen with the bleed through signal in the red circle.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Interference cancellation tools are generally limited in their ability to perform effective excision of interference with power levels similar to the Signal of Interest (SOI). The region where the interferer cannot be effectively excised, defined as the ratio of interferer power to SOI power, is called the deadzone. By updating existing excision tool sets with novel algorithms and architectures of the present solution, the deadzone can be reduced or altogether eliminated.

In order to remove interfering signals from a received signal, the parameters of the interfering signals need to be identified. The parameters include, but are not limited to, carrier frequency, sample rate, pulse shape filter and filter parameters such as alpha $\alpha$ (i.e., the roll-off factor of the signal pulses). Conventional devices auto classify the carrier frequency, symbol rate and modulation types for each interfering signal based on a manually set alpha value for the interfering signal (e.g., a jammer signal). Alpha $\alpha$ is 0.2 to 0.33 for most communication signals. If there is a large mismatch of manual settings of $\alpha$ and what the actual $\alpha$ of the interfering signal is, then leftover portions of the interfering signal remain in the received signal. The leftover portions are referred to herein as horns. Illustrative horns 100 are shown in FIG. 1. The system tries to classify and remove the horns 100 from the received signal as an additional interfering signal. The horns 100 are often not fully removed from the received signal. In some case, the horns 100 are large enough to jam, increase error rates, or block the SOI.

Figure 2:
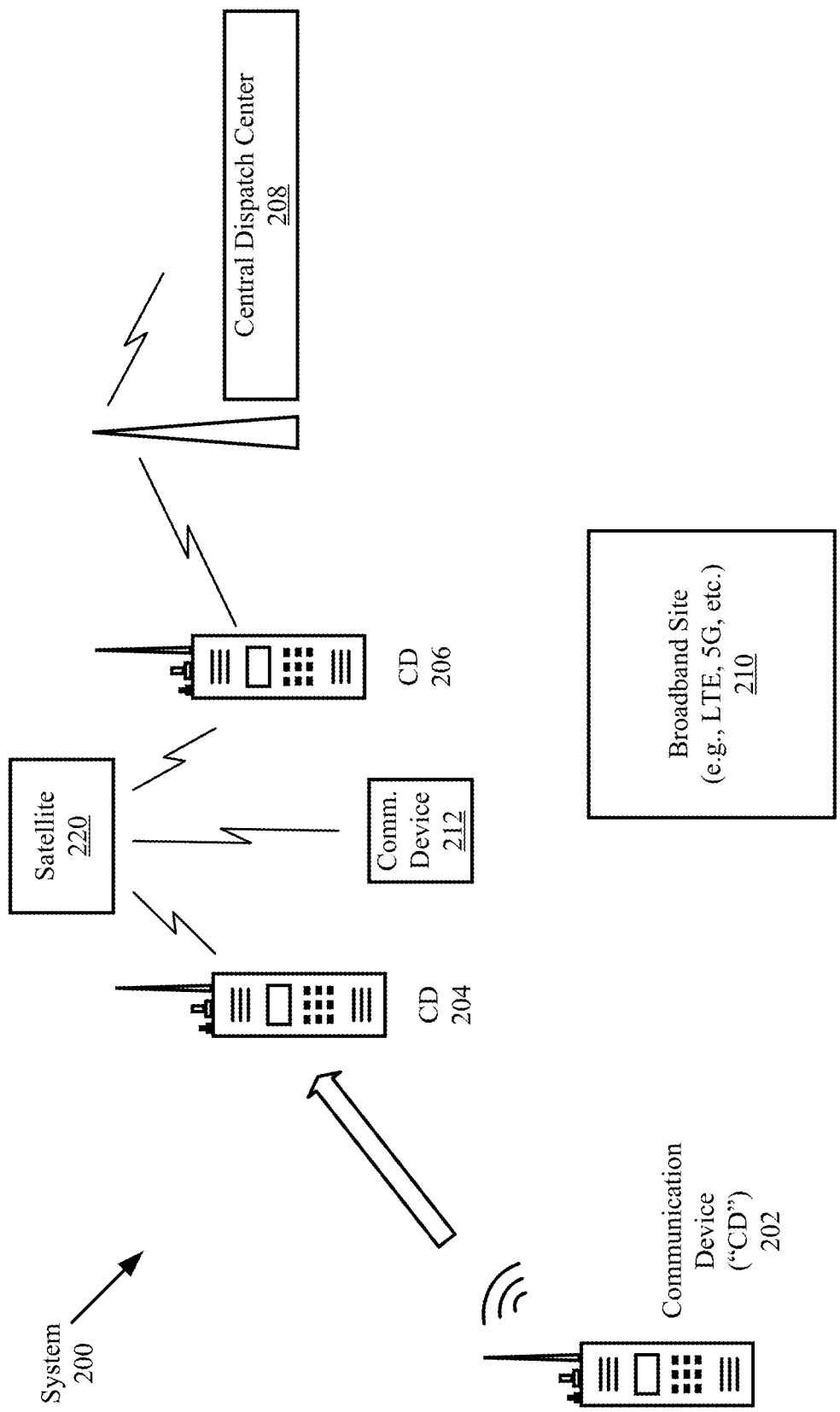
FIG. 2 is an illustration of a system implementing the present solution.

FIG. 2 shows an illustrative system 200 implementing the present solution. System 200 comprises a plurality of communication devices 202, 204, 206, a Central Dispatch Center (CDC) 208, a broadband site 210, and satellite 220. The communication devices 202-206 include, but are not limited to, a portable radio, a fixed radio with a static location, a smart phone, a ground station, and/or a base station. The broadband site 210 includes, but is not limited to, an LMR site, a 2G cellular site, a 3G cellular site, a 4G cellular site, and/or a 5G cellular site. CDC 208 and broadband site 210 are well known in the art, and therefore will not be described herein.

During operation of system 200, the signals at the satellite 220 need processing in accordance with the present solution since that is where interference is occurring. A scenario is that where communication devices all point to the sky, possibly to different satellites 220, but that unwanted signals impinge on satellite 220. Another scenario is where interference may be caused by other sources such as the broadband site 210.

As shown in FIG. 2, signals are communicated between the communication devices 202-206, between one or more communication devices 204, 206, 212 and the satellite 220, and/or between one or more communication devices 206 and the CDC 208. For example, communication device 202 communicates a signal to communication device 204, communication devices 204-206 communicate signals to satellite 220, and CDC 208 communicates a signal to communication device 206. Communication devices 204 and 206 perform operations to mitigate interference caused by the broadband site 210 on a given RF communication channel and/or other communication device 212 on a satellite communication channel. The manner in which communication devices 204 and 206 mitigate the interference to signals will become evident as the discussion progresses.

Figure 3:
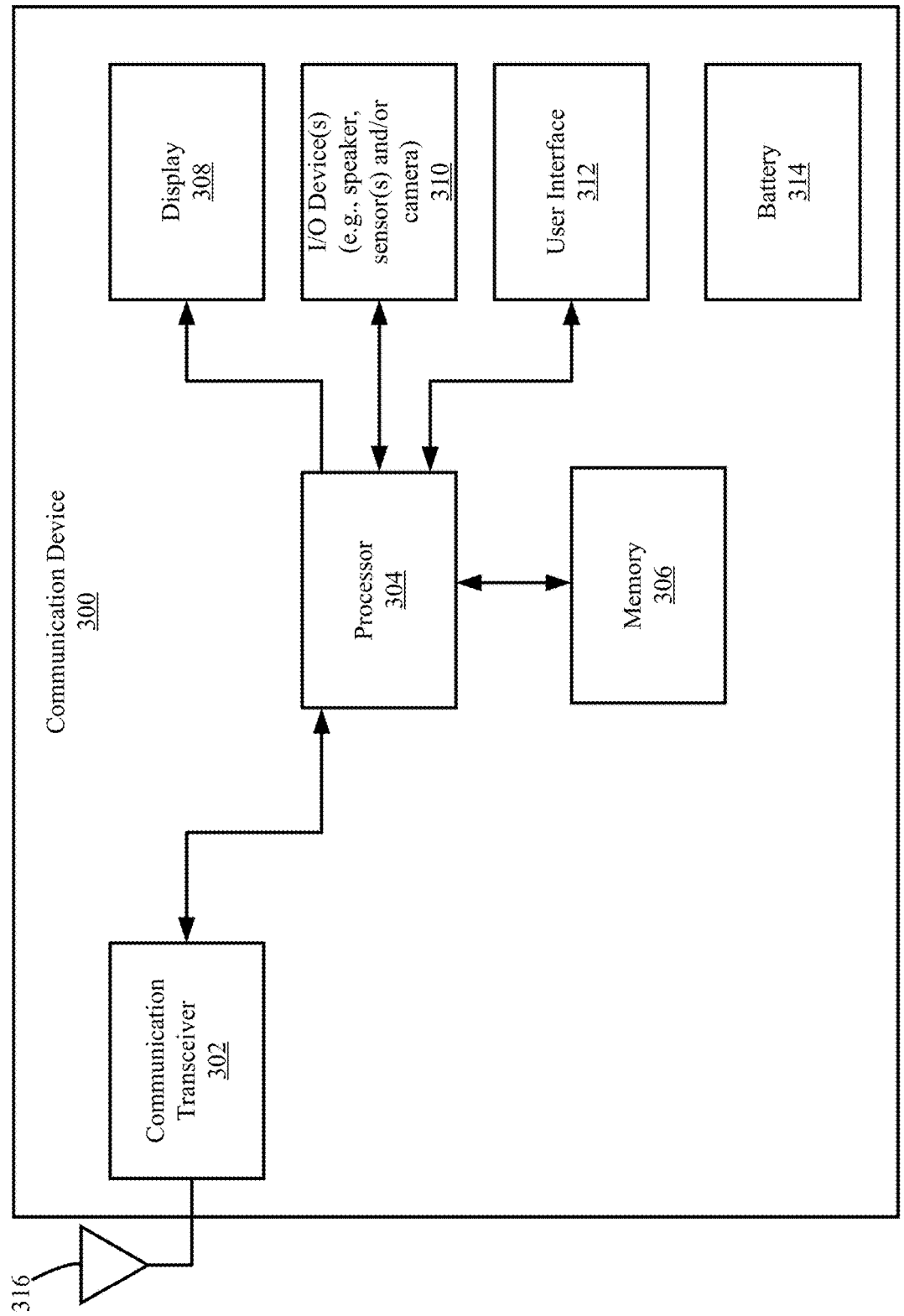
FIG. 3 is an illustration of a communication device architecture.

Referring now to FIG. 3, there is provided an illustration of an example architecture for a communication device 300 which is configured for carrying out the various methods described herein for mitigating the signal interference. Communication devices 202-206 of FIG. 2 are the same as or similar to communication device 300. As such, the discussion provided below in relation to communication device 300 is sufficient for understanding communication devices 202-206 of FIG. 2. Communication device 300 can include more or less components than that shown in FIG. 3 in accordance with a given application. For example, communication device 300 can include one or both components 308 and 310. The present solution is not limited in this regard.

As shown in FIG. 3, the communication device 300 comprises a communication transceiver 302 coupled to an antenna 316. The communication transceiver can comprise one or more components such as a processor, an application specific circuit, a programmable logic device, a digital signal processor, or other circuit programmed to perform the functions described herein. The communication transceiver 302 can enable end-to-end communication services in a manner known in the art. In this regard, the communication transceiver can facilitate communication of data (e.g., voice data and/or media content) from the communication device 300 over a network and/or communications channel (e.g., a satellite communication channel).

The communication transceiver 302 can include, but is not limited to, a radio transceiver, a satellite transceiver, and/or a cellular network communication transceiver. The communication transceiver 302 is connected to a processor 304 comprising an electronic circuit. During operation, the processor 304 is configured to control the communication transceiver 302 for providing communication services. The processor 304 also facilitates mitigation of interference to signals. The manner in which the processor facilitates interference mitigation will become evident as the discussion progresses.

A memory 306, display 308, user interface 312 and Input/Output (I/O) device(s) 310 are also connected to the processor 304. The processor 304 may be configured to collect and store data generated by the I/O device(s) 310 and/or external devices (not shown). The I/O device(s) 310 can include, but is(are) not limited to, a speaker, a microphone, sensor(s) (e.g., a temperature sensor and/or a humidity sensor), and/or a camera. Data stored in memory 306 can include, but is not limited to, one or more look-up tables or databases which facilitate selection of communication groups or specific communication device. The user interface 312 includes, but is not limited to, a plurality of user depressible buttons that may be used, for example, for entering numerical inputs and selecting various functions of the communication device 300. This portion of the user interface may be configured as a keypad. Additional control buttons and/or rotatable knobs may also be provided with the user interface 312. A battery 314 or other power source may be provided for powering the components of the communication device 300. The battery 300 may comprise a rechargeable and/or replaceable battery. Batteries are well known in the art, and therefore will not be discussed here.

The communication device architecture shown in FIG. 3 should be understood to be one possible example of a communication device system which can be used in connection with the various implementations disclosed herein. However, the systems and methods disclosed herein are not limited in this regard and any other suitable communication device system architecture can also be used without limitation. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the illustrative system is applicable to software, firmware, and hardware implementations.

Figure 4:
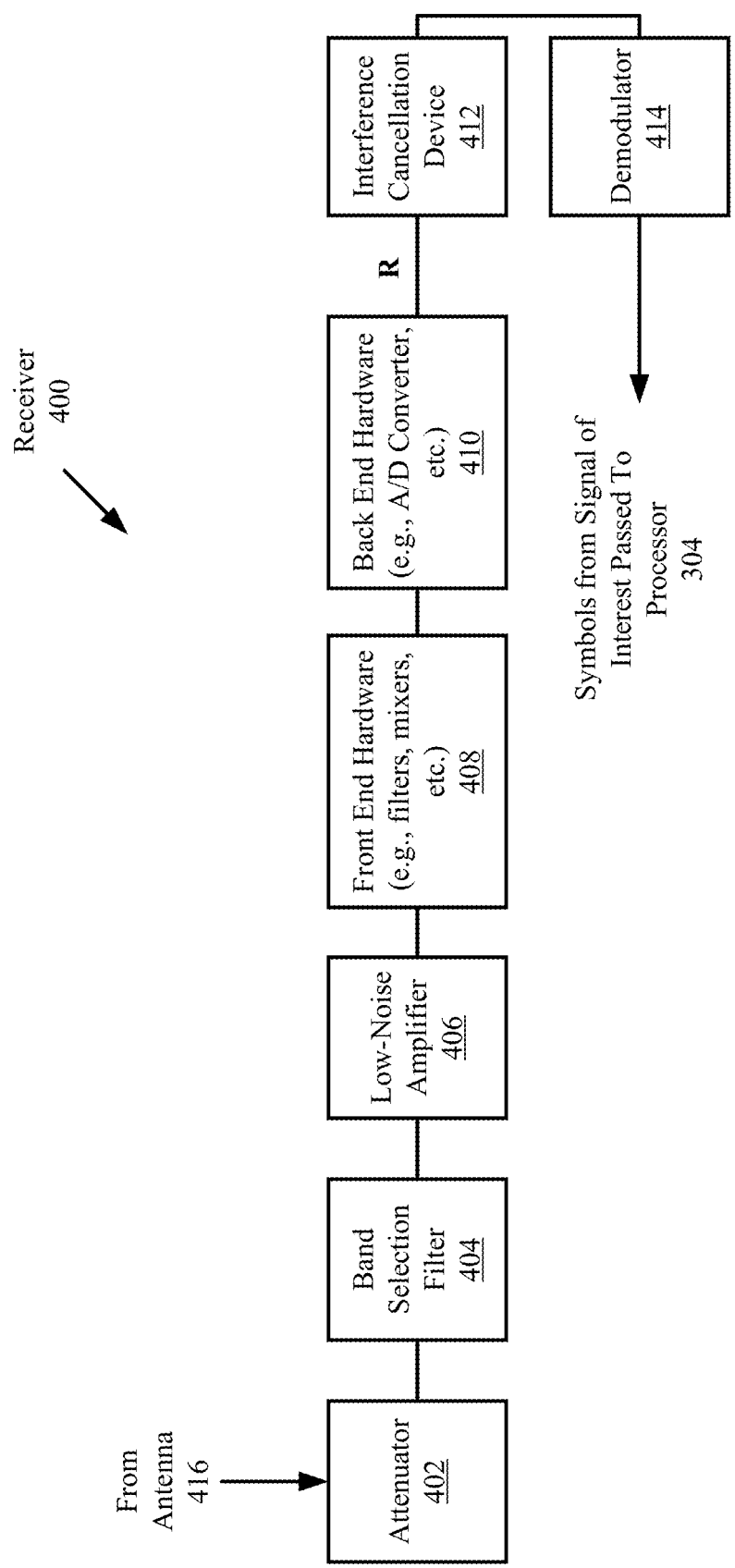
FIG. 4 is an illustration of a receiver architecture.

Referring now to FIG. 4, there is provided a more detailed illustration of an illustrative receiver portion 400 of the communication transceiver 302. Receiver 400 comprises an attenuator 402, a band selection filter 404, a Low-Noise Amplifier (LNA) 406, front end hardware 408, back-end hardware 410, an interference cancellation device 412 and a demodulator 414. Each of the listed devices 402-410 and 414 is known in the art, and therefore will not be described herein. The interference cancellation device 412 implements the present solution and is generally configured to remove interfering signals from received signals. The resulting signal is passed from the interference cancellation device 412 to the demodulator so that, for example, symbols can be extracted therefrom. The manner in which the signal interference is canceled or otherwise removed from received signals will become evident as the discussion progresses.

Figure 5:
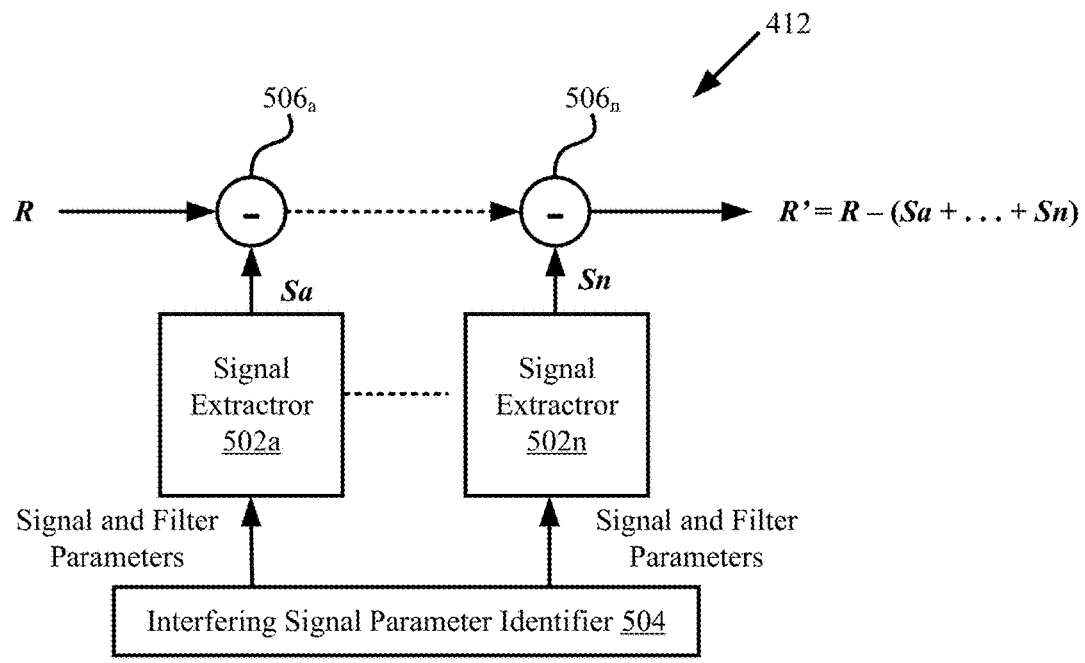
FIG. 5 shows an illustrative architecture for an interference cancellation device implementing the present solution for mitigating interference.

Referring now to FIG. 5, there is provided an illustrative architecture for the interference cancellation device 412 of FIG. 4. The interference cancellation device 412 comprises signal extractors 502a, . . . , 502n, signal combiners 506a, . . . , 506n, and an interfering signal parameter identifier 504. Each signal extractor is generally configured to excise or otherwise extract an interference signal component Sa, . . . , Sn from the received signal R. Signal and filter parameters are dynamically generated in block 504 and provided to the signal extractors 502a, . . . , 502n for facilitating excision of the interference signal components. The operations of block 504 will become evident as the discussion progresses. The interference signal components Sa, . . . , Sn are subtracted from the received signal R at the respective signal combiner 506a, . . . , 506n to produce a signal R' representing the SOI. The signal combiners 506a, . . . , 506n can include, but are not limited to, signal subtractors configured to subtract the interference signal components from the received signal.

Figure 6:
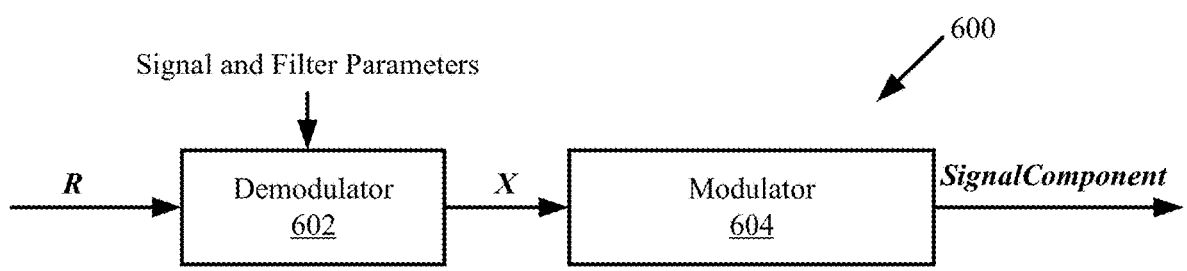
FIG. 6 shows an illustrative architecture for a signal extractor.

An illustrative architecture 600 for a signal extractor is shown in FIG. 6. Each signal 502a, . . . , 502n of FIG. 5 can be the same as or similar to signal extractor 600. Thus, the discussion of signal extractor 600 is sufficient for understanding signal extractors 502a, . . . , 502n of FIG. 5.

As shown in FIG. 6, signal extractor 600 comprises a Demodulator-Remodulator (D-R) engine. The D-R engine is generally configured to demodulate the interfering component signal and reconstruct the interfering component signal would look like if it had not been overlapping the other component signals. The D-R engine comprises a demodulator 602 and a modulator 604. Demodulator 602 comprises an electronic circuit and/or computer program that is(are) configured to separate information that was modulated onto a carrier wave from the carrier wave itself using the dynamically generated signal and filter parameters which are input thereto. The manner in which the signal and filter parameters are dynamically generated will become evident as the discussion progresses.

During operation, the demodulator 602 receives a signal R and generates hard symbol decisions of a given signal component contained therein. The hard symbol decisions X are passed to the modulator 604. The modulator 604 performs operations to vary one or more properties of a waveform using the hard symbol decisions X to produce a waveform representing the signal component (e.g., an interfering signal).

Figure 7:
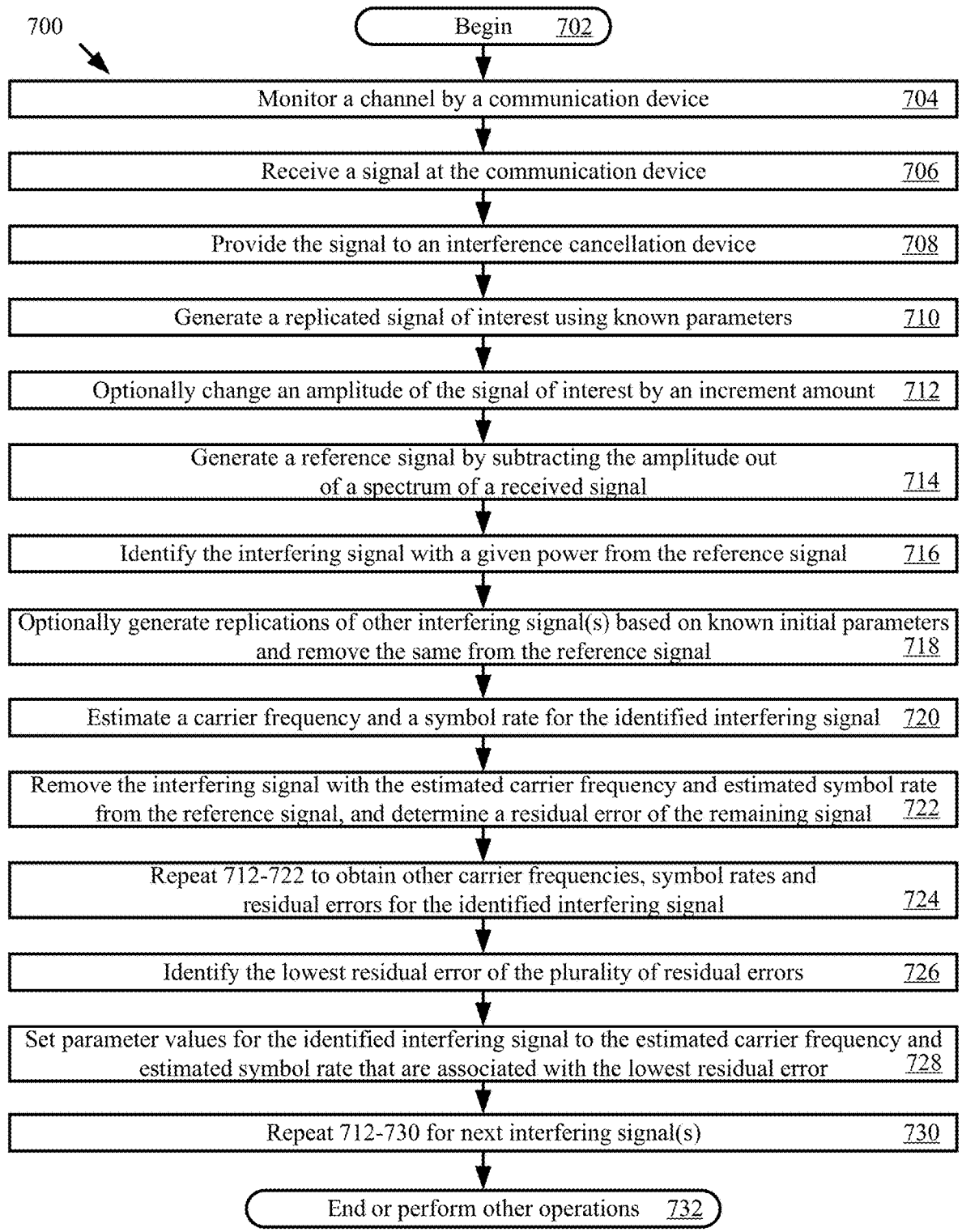
FIG. 7 provides a flow diagram of an illustrative method for determining parameters for interfering signals.

Referring now to FIG. 7, there is provided a method 700 for mitigating interference. Method 700 implements SOI scale sweeping (SS) which will become evident from the following discussion. At least some of method 700 can be performed in block 412 of FIG. 4, in block 504 of FIG. 5 and/or by a computer system of FIG. 17.

Method 700 begins with 702 and continues with 704 where a communication device (e.g., communication device 204 or 206 of FIG. 1) performs operations to monitor a communications channel (e.g., a satellite communication channel). Methods for monitoring communication channels are well known in the art. The communication device receives a signal (e.g., signal R of FIG. 5) in 706. Methods for receiving signals are well known in the art.

In 708, the received signal is provided to an interference cancellation device (e.g., interference cancellation device 412 of FIG. 4). The interference cancellation device may be provided in a receiver (e.g., receiver 400 of FIG. 4) of the communication device. At the interference cancellation device, operations are performed in 710 to generate a replicated SOI using known parameters thereof. The known parameters include, but are not limited to, a carrier frequency, a symbol rate, a pulse shape filter and an alpha value. An amplitude of the replicated SOI is optionally changed in 712 (e.g., increased or decreased) by an increment amount. The amount by which the amplitude is changed can be pre-defined and stored in a datastore (for example, memory 306 of FIG. 3) of the communication device. This operation of block 712 is optional because it may or may not be performed in a first iteration of the process to determine a first residual error of a plurality of residual errors associated with the identified interfering signal.

Figure 8:
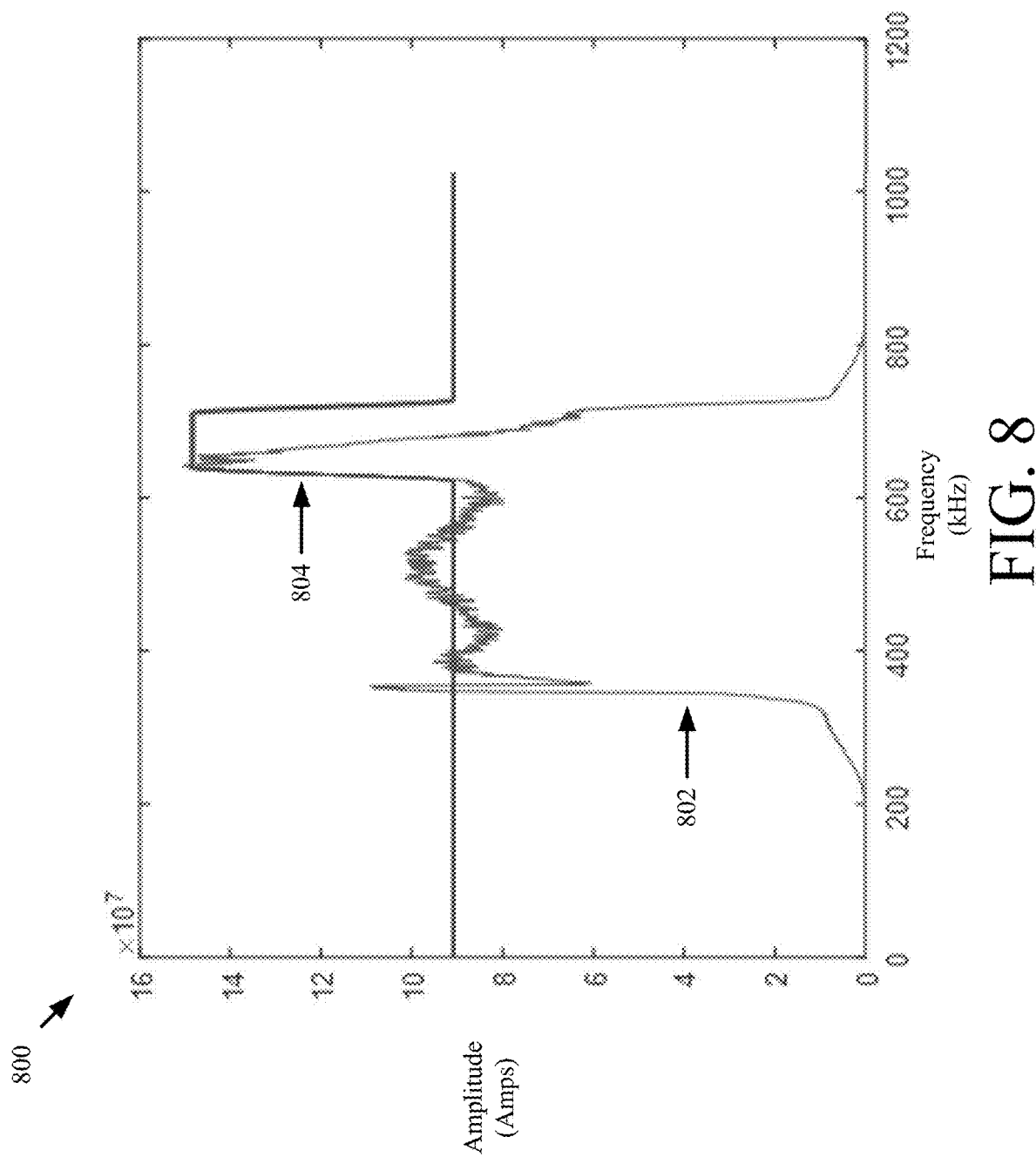
FIG. 8 provides a graph showing an illustrative measured spectrum.

In 714, a reference signal $S_{SSref}$ is generated by removing the amplitude of the SOI from the measured spectrum of the received signal R. An illustrative measured spectrum 802 of a received signal is shown in graph 800 of FIG. 8. The reference signal $S_{SSref}$ can be defined as follows.

$$S_{SSref} = SOI_{remainder} + I_{1-n}$$

where $SOI_{remainder}$ refers to any remaining portions of the SOI and $I_{1-n}$ refers to the interfering signals $I_1, I_2, \ldots, I_n$. An illustrative reference signal 902 is shown in graph 900 of FIG. 9.

The reference signal $S_{SSref}$ is then analyzed in 716 to identify the interfering signal with a given power. For example, a first interfering signal $I_1$ is identified since it has the greatest power of all the interfering signals (which have not yet been considered) in a Region of Interest (ROI) of the reference signal. The present solution is not limited to the particulars of this example.

Operations can optionally be performed in 718 to generate replications of the other interfering signal(s) (e.g., signals $I_2, \ldots, I_n$) using initial parameters for the same. The initial parameters may be manually input into the system and stored in the datastore (e.g., memory 306 of FIG. 3). Alternatively, the initial parameters could be determined using known techniques and/or using a machine learning algorithm based on historical interfering signal data. The replicated signals may then be removed from the reference signal $S_{SSref}$ to produce a modified reference signal $S'_{SSref}$. The modified reference signal can be defined as follows.

$$S'_{SSref} = SOI_{remainder} + I_{dentified}$$

where $I_{dentified}$ refers to the signal which was identified in block 716 (e.g., signal $I_1$).

In 720, the carrier frequency and symbol rate of the identified interfering signal are estimated. These estimations are achieved by: detecting a peak frequency of the signal (e.g., signal $S_{SSref}$ or $S'_{SSref}$) in the ROI; identifying the 3 dB drop off points of the signal; considering the 3 dB drop off points as the corner frequencies of a pulse in the identified interfering signal; determining a difference between the two corner frequencies; considering this difference as an estimated symbol rate; identifying a center frequency between the two corner frequencies; and considering the center frequency as an estimated carrier frequency.

Figure 9:
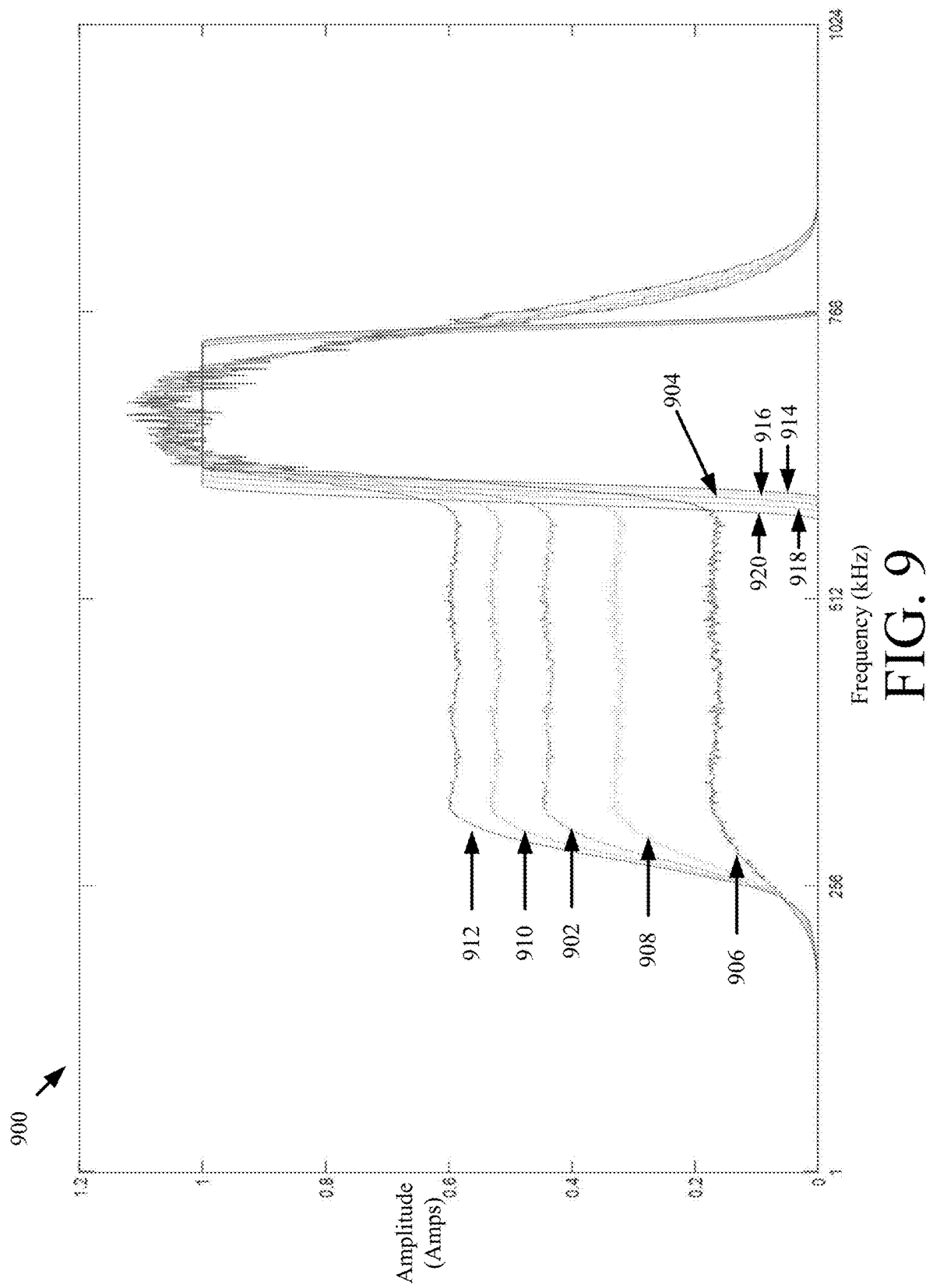
FIG. 9 provides a graph that is useful for understanding the method of FIG. 7.

In 722, the estimated carrier frequency and estimated symbol rate are used to remove the interfering signal from the reference signal $S_{SSref}$ or the modified reference signal $S'_{SSref}$. The resulting signal $S_{remaining}$ may be defined as follows.

$$S_{remaining} = S_{SSref} - I_{1-estimate} = SOI_{remainder} + I_{1-n} - I_{1-estimate}, \text{ or}$$

$$S'_{SSref} - I_{1-estimate} = SOI_{remainder} + I_1 - I_{1-estimate} = SOI_{remainder} + I_{1-remainder}$$

where $I_{1-estimate}$ refers to the interference signal with the estimated parameters, and $I_{1-remainder}$ refers to any remaining portion of the interference signal. An illustrative estimated interference signal 904 is shown in FIG. 9. A residual error of the resulting signal $S_{remaining}$ is then determined using any known or to be known technique. For example, the residual error $E_{residual}$ can be defined as follows.

$$E_{residual} = (R - SOI_{estimate} - I_{1-estimate})^2 = (S_{SSref} - I_{1-estimate})^2, \text{ or } (S'_{SSref} - I_{1-estimate})^2$$

In this case, the residual error is the square of an error defined as the difference between the received signal (with or without the other interfering signals removed), a scaled version of the SOI and the estimated interfering signal. The present solution is not limited to the particulars of this example.

As shown by block 724, the operations of 712-722 are repeated to obtain other estimated carrier frequencies, symbol rates and residual errors for the identified interfering signal using different amounts of amplitude adjustment to the SOI. This process is repeated any number of times in accordance with a given application. For example, as shown in FIG. 9, the process may be performed a total of seven times. Signals 906-912 each represent a reference signal which was produced using an SOI with an increased or decreased amplitude. Signals 904, 914-920 represent estimated versions of a given interfering signal which were each determined using a respective one of the reference signals 902, 906-912. Estimated interfering signal 904 is associated with reference signal 902. Estimated interfering signal 914 is associated with reference signal 906. Estimated interfering signal 916 is associated with reference signal 908. Estimated interfering signal 918 is associated with reference signal 910 and estimated interfering signal 920 is associated with reference signal 912. As can be seen from FIG. 9, the carrier frequency and symbol rate changes (e.g., moves to the left of graph 900) as the amplitude of the SOI changes.

Referring back to FIG. 7, method 700 continues with 726 where the lowest residual error of the plurality of residual errors is identified. The parameters for the identified interference signal are set equal to the estimated carrier frequency and symbol rate that are associated the lowest residual error, as shown by 728.

Method 700 continues with 730 where the operations of 712-728 are repeated for each of the other interfering signals. It should be noted that optional 718 would involve removing one or more interfering signals other than the identified reference signal from the reference signal. For example, in a second iteration, an interfering signal $I_2$ with a next highest power is identified from interfering signals $I_1, \ldots, I_n$. Thus, interfering signal $I_1$ (with the refined parameters), $I_3$ (with the initial gross parameters), $\ldots, I_n$ (with the initial gross parameters) may be removed from the reference signal to produce the modified reference signal. In a third iteration, an interfering signal $I_3$ with the next highest power is identified from interfering signals $I_1, \ldots, I_n$. Thus, interfering signals $I_1$ (with the refined parameters), $I_2$ (with the refined parameters), $I_4$ (with the initial gross parameters), $\ldots, I_n$ (with the initial gross parameters) may be removed from the reference signal to produce the modified reference signal, and so on. The present solution is not limited to the particulars of this example.

Subsequently, 732 is performed where method 700 ends or other operations are performed. The other operations can include, but are not limited to, continuing with another process (e.g., process 1000 of FIG. 10) to further refine the parameters for the interfering signals, determining an alpha value for each interfering signal using the set parameters (e.g., via process 1300 of FIG. 13), and/or removing the interfering signals with the set parameters and/or alpha values from the received signal to obtain the SOI.

In some scenarios, matrix mathematics can be used to facilitate the operations of method 700. Other techniques can additionally or alternatively be used to implement some or all of method 700.

Figure 10:
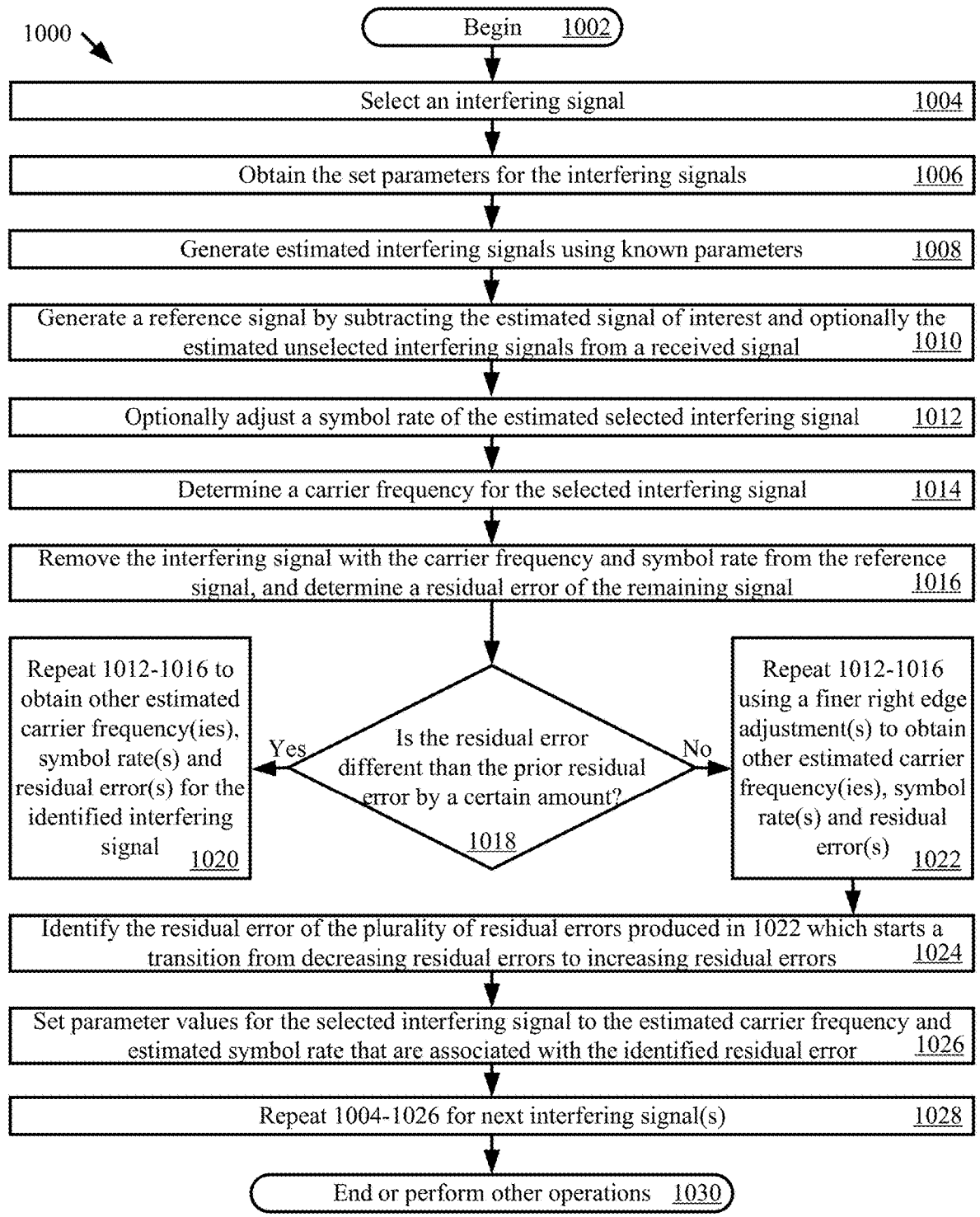
FIG. 10 provides a flow diagram of another illustrative method for determining parameters for interfering signals.

Referring now to FIG. 10, a flow diagram of a method 1000 for refining parameters of the interfering signals is provided. Method 1000 implements gradient crossing (GC) which will become evident from the following discussion. Method 1000 begins with 1002 and continues with 1004 where an interference signal is selected. For example, interference signal $I_1$ is selected from the interference signals $I_1, \ldots, I_n$. The set parameters for the selected interfering signal and the other interference signals are obtained in 1006 from a datastore (e.g., memory 306 of FIG. 3). The parameters can include, but are not limited to, carrier frequencies and symbol rates. The values of the parameters may have been set in block 728 of FIG. 7.

In 1008, an estimate of the SOI $SOI_{estimated}$ is generated using known parameters of the SOI. An estimate of each other interfering signal $I_{estimated}$ is also generated using the set parameters obtained in 1006. The estimated SOI and optionally the estimated interfering signal(s) are removed from the received signal R to obtain a reference signal $S_{GCref}$ in 1010. The reference signal can be defined as follows.

$$S_{GCref} = R - SOI_{estimated} - I_{estimated\text{-}unselected1} - \cdots - I_{estimated\text{-}unselectedm} = SOI_{remainder} + I_{selected}$$

where $SOI_{remainder}$ refers to any remaining portion of the SOI, and $I_{estimated\text{-}unselected1}, \ldots, I_{estimated\text{-}unselectedm}$ refer to the other interfering signals which were not selected in 1004 (e.g., $I_2, \ldots, I_n$), and $I_{selected}$ refers to the interfering signal which was selected in 1004. An illustrative received signal 1102 and an illustrative reference signal 1104 are shown in graph 1100 of FIG. 11.

Figure 11:
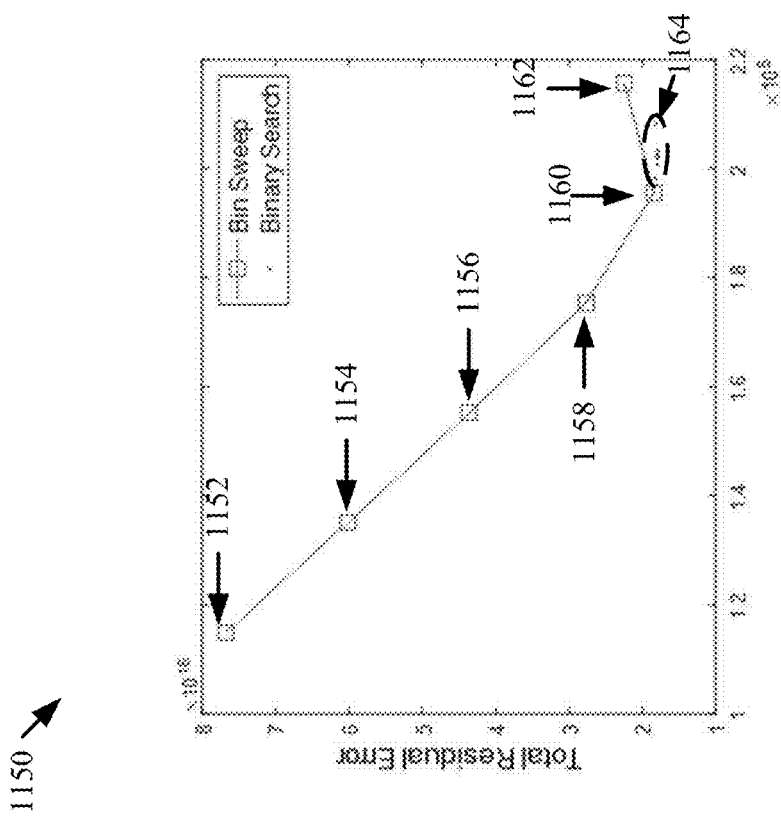
FIGS. 11-12 provides graphs that are useful for understanding the method of FIG. 10.
Figure 11:
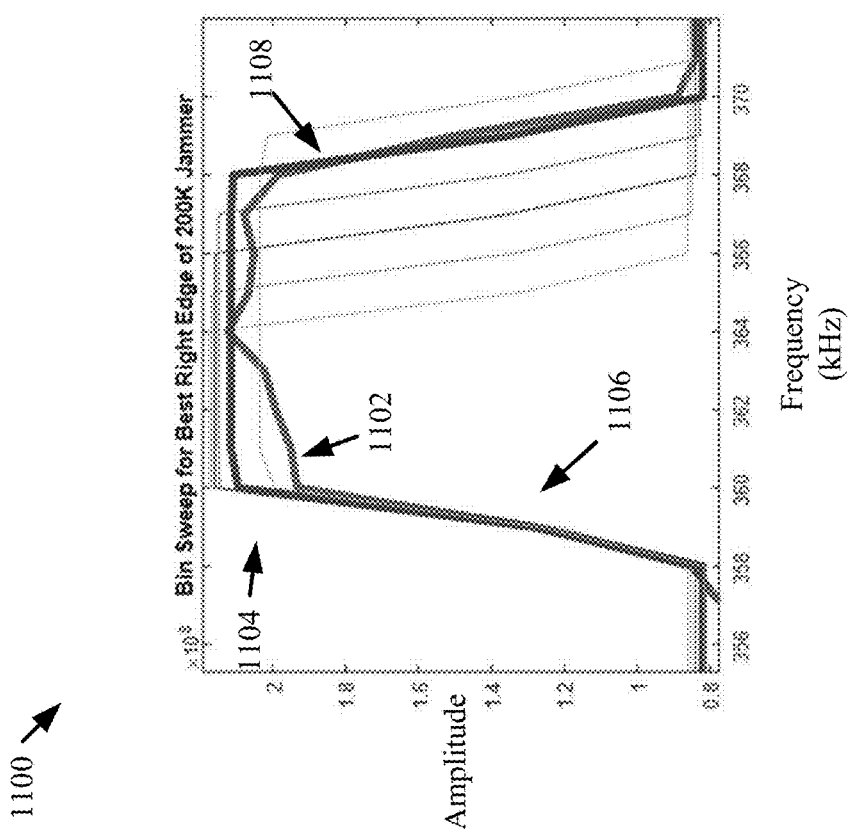

In optional 1012, the pulse width (or symbol rate) of the estimated selected interfering signal is modified. The pulse width (or symbol rate) can be modified by adjusting a right edge of a pulse in the signal. For example, as shown in FIG. 11, a left edge 1106 of a pulse is held at a fixed location while the right edge 1108 of the pulse is increased or decreased in frequency. The amount by which the right edge's location is adjusted can be a pre-defined and/or configurable increment amount. The operations of 1012 are optional because this adjustment may not be performed in a first iteration of the process, but performed in each subsequent iteration. Note that the amplitude of the pulse changes as the symbol rate changes.

In 1014, the computing device determines the carrier frequency for the selected interfering signal. These estimations are achieved by: identifying a center frequency between the two corner frequencies of the pulse; and considering the center frequency as the carrier frequency.

In 1016, the interfering signal with the symbol rate and carrier frequency is removed (e.g., via signal subtraction operations) from the reference signal, and a residual error is determined for the remaining signal. The residual error can be determined in the same or similar manner as described above in relation to block 722 of FIG. 7.

If the residual error is different than the prior residual error by a certain amount (e.g., 10% less than) [1018:YES], then operations of blocks 1012-1016 are repeated to obtain another estimated carrier frequency, estimated symbol rate and residual error for the identified interfering signal. Illustrative residual errors 1152, 1154, 1156, 1158, 1160, 1162 obtained during these iterations of the process are shown in graph 1150 of FIG. 11.

In contrast, if the residual error is not different than the prior residual error by a certain amount (e.g., 10% less than) [1018:NO], then a first stage of the processes is stopped and a second stage of the process is started. In the second stage, the operations of 1012-1016 are repeated using finer symbol rate (or right edge) adjustments to obtain other estimated carrier frequency(ies), estimated symbol(s) and residual error(s). For example, with reference to FIG. 11, since residual error 1162 is greater than prior residual error 1160, the computing device enters into a second stage where operations 1012-1016 are performed using smaller incremented amounts of change to the symbol rate. Illustrative residual errors 1164 obtained during this second stage are shown in FIG. 11.

Upon completing 1020 or 1022, method 1000 continues with 1024 where the computing device identifies the residual error produced in the second stage which starts a transition from decreasing residual errors to increasing residual errors. For example, with reference to FIG. 12, residual error 1202 is identified as the transitioning residual error.

Figure 12:
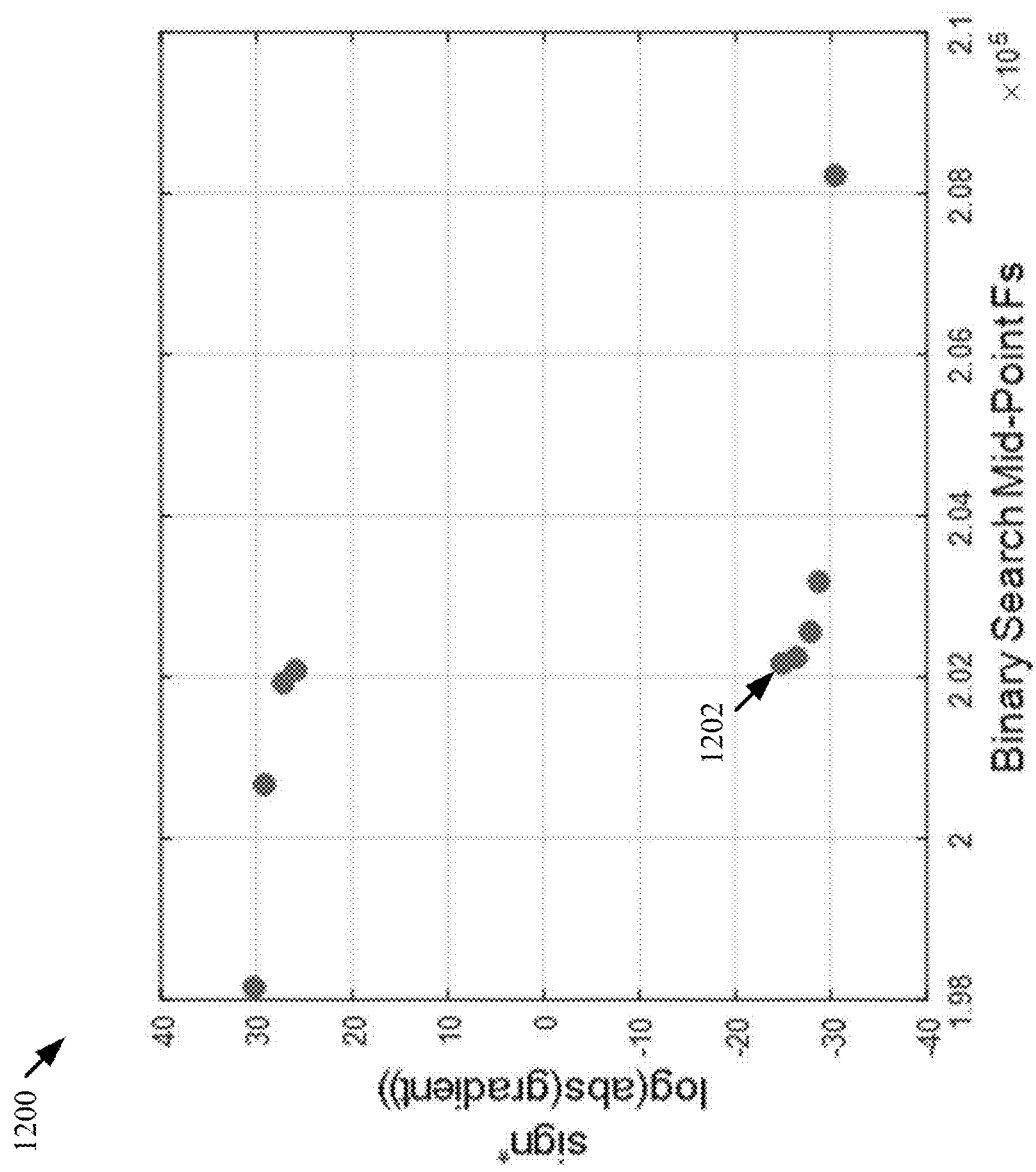

In 1026, the parameters for the selected interfering signal are set to the carrier frequency and symbol rate that are associated with the identified residual error (for example, residual error 1202 of FIG. 12). The operations of 1004-1026 may be repeated for next interfering signal(s). Subsequently, 1030 is performed where method 1000 ends or other operations are performed (for example, return to 1002).

In some scenarios, matrix mathematics can be used to facilitate the operations of method 1000. For example, a recalculated interfering signal may be formed by solving the following matrix equation M=C×G, where C refers to the estimated signals, G refers to the gain of the signals and M refers to the measured signal. The matrix equation is solved for G using linear algebra, i.e., $G = M \times C^{-1}$. The matrix equation can be enlarged to handle more than one interfering signal. A binary search can then be performed to find a zero gradient between endpoints. The residual error is determined between the measured interfering signal and the reconstructed interfering signal. The zero gradient is the best right-side roll-off of the interfering signal. Other techniques can additionally or alternatively be used to implement some or all of method 1000.

Figure 13:
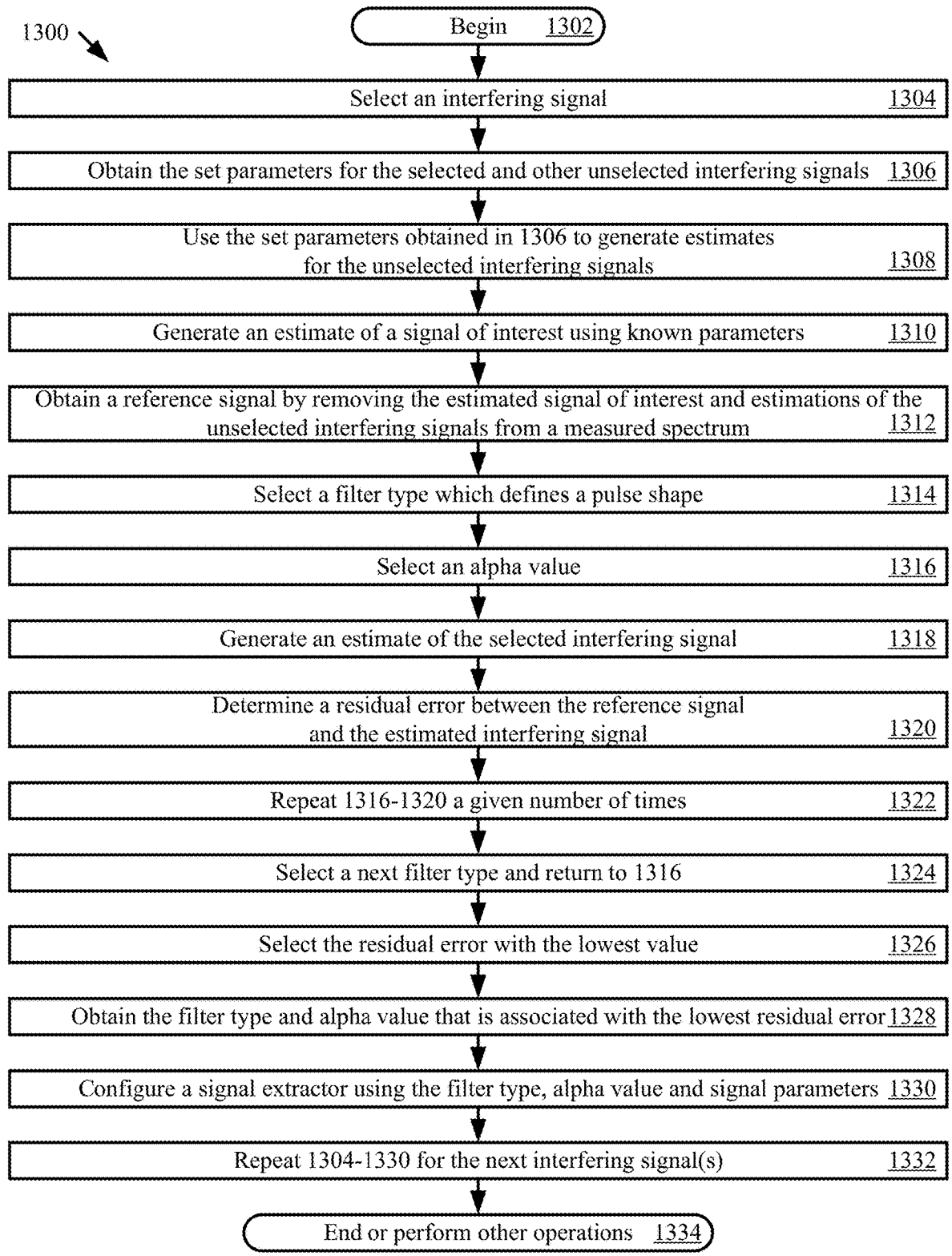
FIG. 13 provides a flow diagram of an illustrative method for determine an alpha (or roll-off factor) for an interfering signal.

FIG. 13 provides a flow diagram of an illustrative method 1300 for determining an alpha or roll-off factor of an interfering signal's pulses. Method 1300 may be performed subsequent to method 700 of FIG. 7 using the refined parameters for the interfering signals and/or method 1000 of FIG. 10 using the further refined parameters for the interfering signals.

Figure 14:
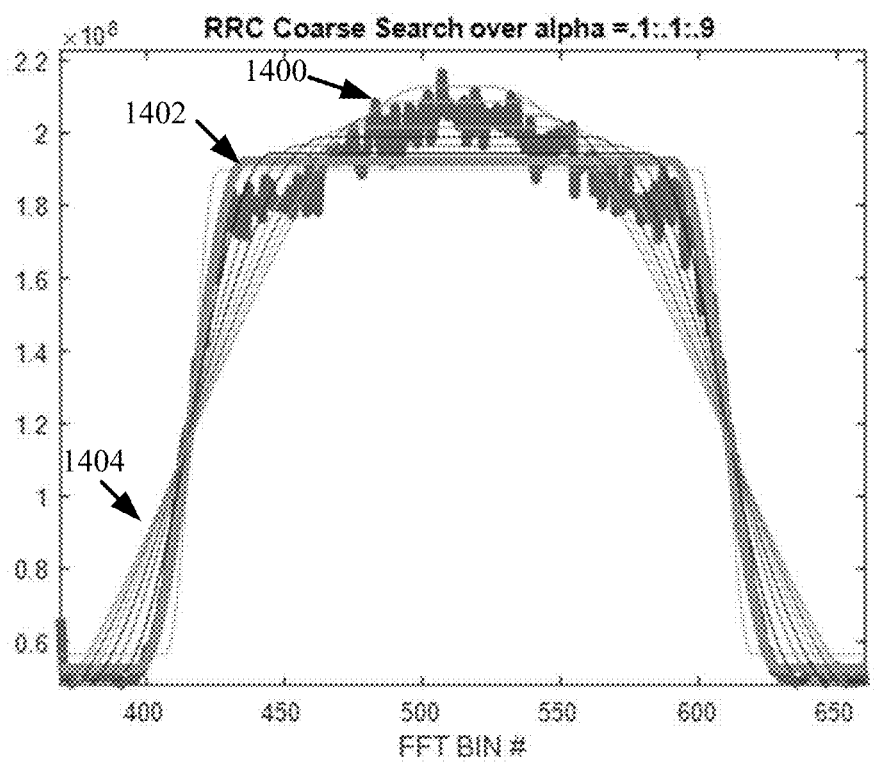
FIGS. 14-15 provides graphs that are useful for understanding the method of FIG. 13.

Method 1300 begins with 1302 and continues with 1304 where the computing device selects an interfering signal (e.g., interfering signal $I_1$ of signals $I_1, I_2, \ldots, I_n$). The set parameters for the selected interfering signal and any other interfering signal are obtained in 1306. The parameters for each interfering signal can include, but are not limited to, carrier frequency and symbol rate. These parameters are used in 1308 to generate estimates of the unselected interfering signal (e.g., interfering signals $I_2, \ldots, I_n$). An estimate of the SOI is also generated in 1310. The estimated SOI and unselected interfering signal(s) are then removed (e.g., subtracted) from a measured spectrum to obtain a reference signal in 1312. An illustrative measured spectrum 1400 and reference signal 1402 are shown in FIG. 14.

Figure 15:
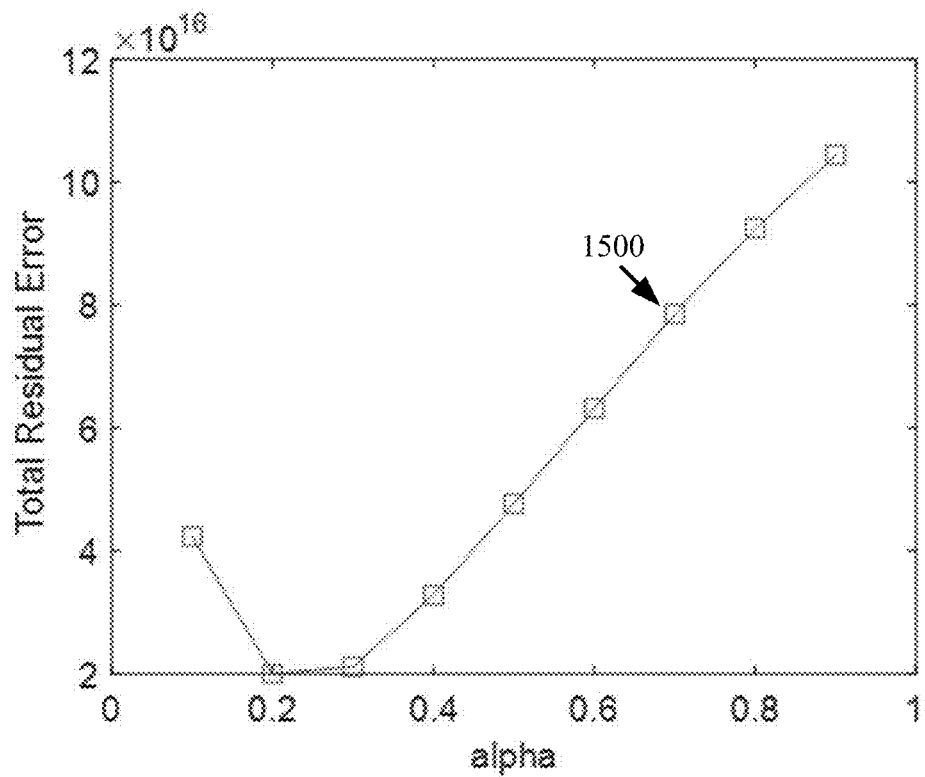

In 1314, a filter type is selected. The filter type can include, but is not limited to, a root raised cosine filter, a cosine filter, a square wave filter, and a triangle filter. The filter defines a pulse shape for a signal. An alpha value is selected in 1316. The alpha value can include, but is not limited to, a decimal number between zero and one. The alpha value specifies a roll-off a pulse's edge. Next in 1318, an estimate of the selected interfering signal is generated using the parameters obtained in 1306 (e.g., the carrier frequency and symbol rate), the pulse shape specified by the filter type selected in 1314 and the alpha value selected in 1316. A residual error is determined in 1320 between the reference signal and the estimated interfering signal. The residual error can be determined in the same or similar manner as that discussed above in relation to block 722 of FIG. 7. As shown by block 1322, the operations of 1316-1320 are repeated a given number of times (e.g., 10 times) using different alpha values. Illustrative estimated interfering signals 1404 with different alpha values are shown in FIG. 14. Illustrative residual errors 1500 are shown in FIG. 15.

In 1324, a next filter type is selected. For example, if the filter type selected in 1314 was a root raised cosine filter, then a cosine filter type or other different filter type is selected in 1326. Method 1300 then returns to 1316 so that the process is repeated using a different pulse shape.

Once all of the filter types of interest have been considered, the computing device analyzes the residual errors in 1326 to identify the one with the lowest value. The filter type and alpha value associated with the lowest residual error are then obtained in 1328, and used as inputs to a signal extractor in 1330 (e.g., signal extractor 502a, . . . , or 502n of FIG. 5) that will be used to extract the interfering signal component from the received signal. The refined parameters (e.g., carrier frequency and symbol rate) for the interfering signal are also input into the signal extractor.

The operations of blocks 1304-1330 are repeated for the next interfering signal(s). Subsequently, 1334 is performed where method 1300 ends or other operations are performed (e.g., the operations of components 502a, . . . , 502n, 506a, . . . , 506n of FIG. 5).

Figure 16:
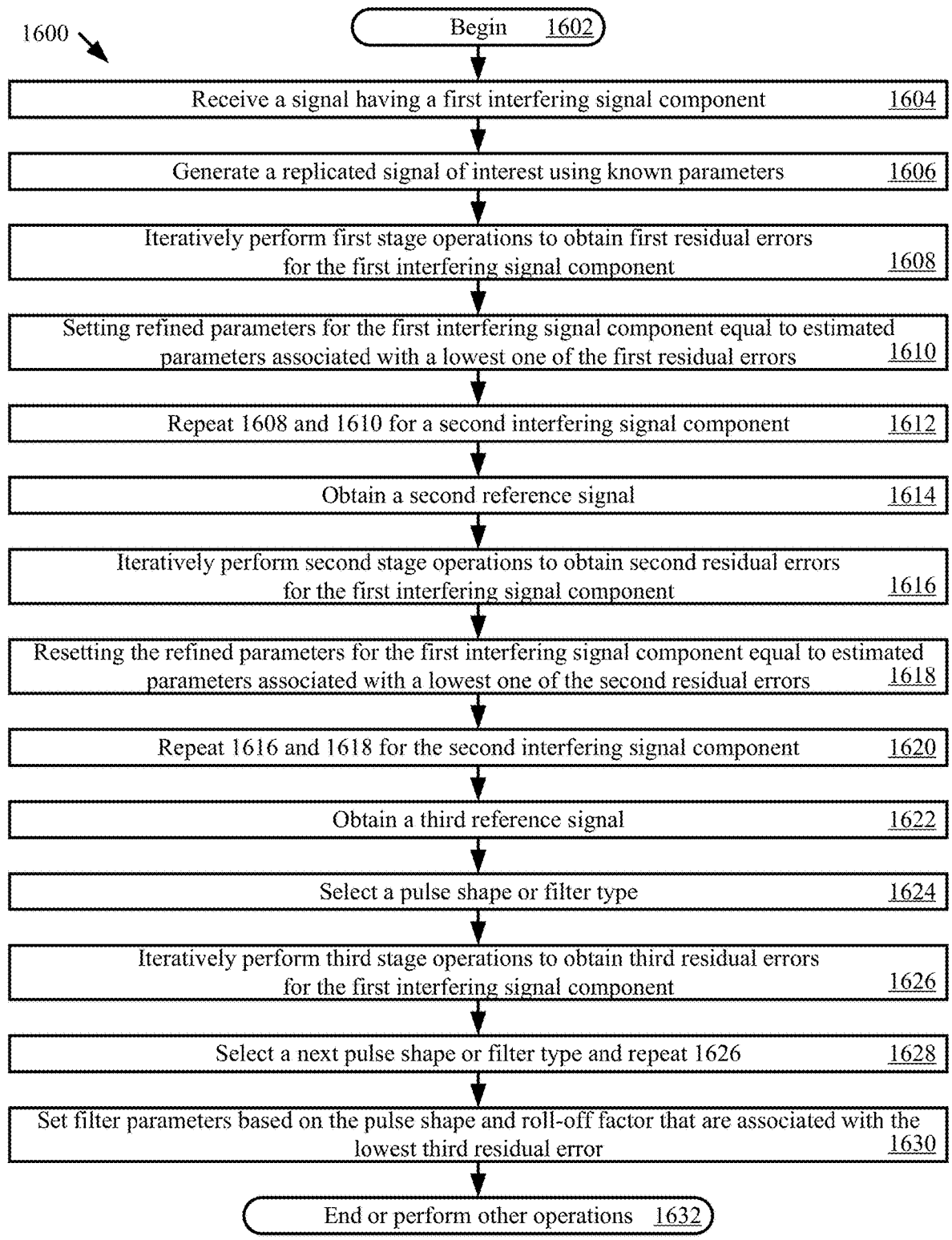
FIG. 16 provides a flow diagram of a method for interference cancelation.

FIG. 16 provides a flow diagram of an illustrative method 1600 for interference cancelation. Method 1600 begins with 1602 and continues with 1604 where a device (e.g., interference cancellation device 412 of FIG. 4) of a receiver (e.g., receiver 400 of FIG. 4) receives a signal (e.g., signal R of FIGS. 4-5) having a first interfering signal component (e.g., interfering signal component Sa of FIG. 5). A replicated SOI is generated in 1606 using known parameters.

In 1608, first stage operations are iteratively performed to obtain first residual errors for the first interfering signal component. The first stage operations involve: modifying an amplitude of the replicated SOI; obtaining a first reference signal by removing, from the received signal, the replicated signal of interest with the modified amplitude and optionally estimated interfering signal(s) which is(are) generated using initial gross parameters for second interfering signal component(s) of the received signal; analyzing the first reference signal to obtain an estimated carrier frequency and an estimated symbol rate for the first interfering signal component; generating a remaining signal by removing, from the first reference signal, a signal having the estimated carrier frequency and the estimated symbol rate; and determining a residual error of the remaining signal. The amplitude of the replicated SOI is modified by a different amount in each iteration of the first stage operations. Refined parameters for the first interfering signal component are set equal to the estimated parameters (i.e., carrier frequency and symbol rate) that are associated with a lowest one of the first residual errors, as shown by 1610.

The operations of 1608-1610 are repeated for any other second interfering signal component of the received signal, as shown by 1612.

In 1614, a second reference signal is obtained. The second reference signal can be obtained by removing, from the received signal, the replicated SOI and optionally estimated interfering signal(s) generated using the refined parameters for second interfering signal component(s) of the received signal.

Next in 1616, second stage operations are iteratively performed to obtain second residual errors for the first interfering signal component. The second stage operations involve: generating an estimate of the first interfering signal component using the refined parameters which were previously set based on results of the first stage operations; adjusting a symbol rate of the estimate of the first interfering signal; analyzing the estimate of the first interfering signal to obtain a refined estimated carrier frequency for the first interfering signal component; generating a resulting signal by removing, from the second reference signal, a signal having the refined carrier frequency and the symbol rate; and determining a residual error of the resulting signal. The symbol rate of the estimate of the first interfering signal is modified by a different amount in each iteration of the second stage operations. The refined parameters for the first interfering signal component are reset equal to the estimated parameters (i.e., symbol rate and carrier frequency) that are associated with a lowest one of the second residual errors, as shown by 1618.

The operations of 1616-1618 are repeated for any other second interfering signal component of the received signal, as shown by 1620.

In 1622, a third reference signal is obtained. Third reference signal can be obtained by removing, from the received signal, the replicated SOI and replicated interfering signal(s) generated using the refined parameters thereof. A pulse shape or filter type is then selected in 1624.

In 1624, third stage operations are iteratively repeated to obtain third residual errors for the first interfering signal component. The third stage operations involve: selecting a roll-off factor from a plurality of different roll-off factors; generating an estimate of the first interfering signal component using the pulse shape, the roll-off factor and the refined parameters for the first interfering signal component; and determining a residual error between the third reference signal and the estimate of the first interfering signal component. Subsequently, a next pulse shape or filter type is selected in 1626. The third stage operations are then iteratively performed once again using the next pulse shape or filter type. Filter parameters are set in 1630 based on the pulse shape and roll-off factor that are associated with a lowest one of the third residual errors. Subsequently, 1632 is performed where method 1600 ends or other operations are performed.

Figure 17:
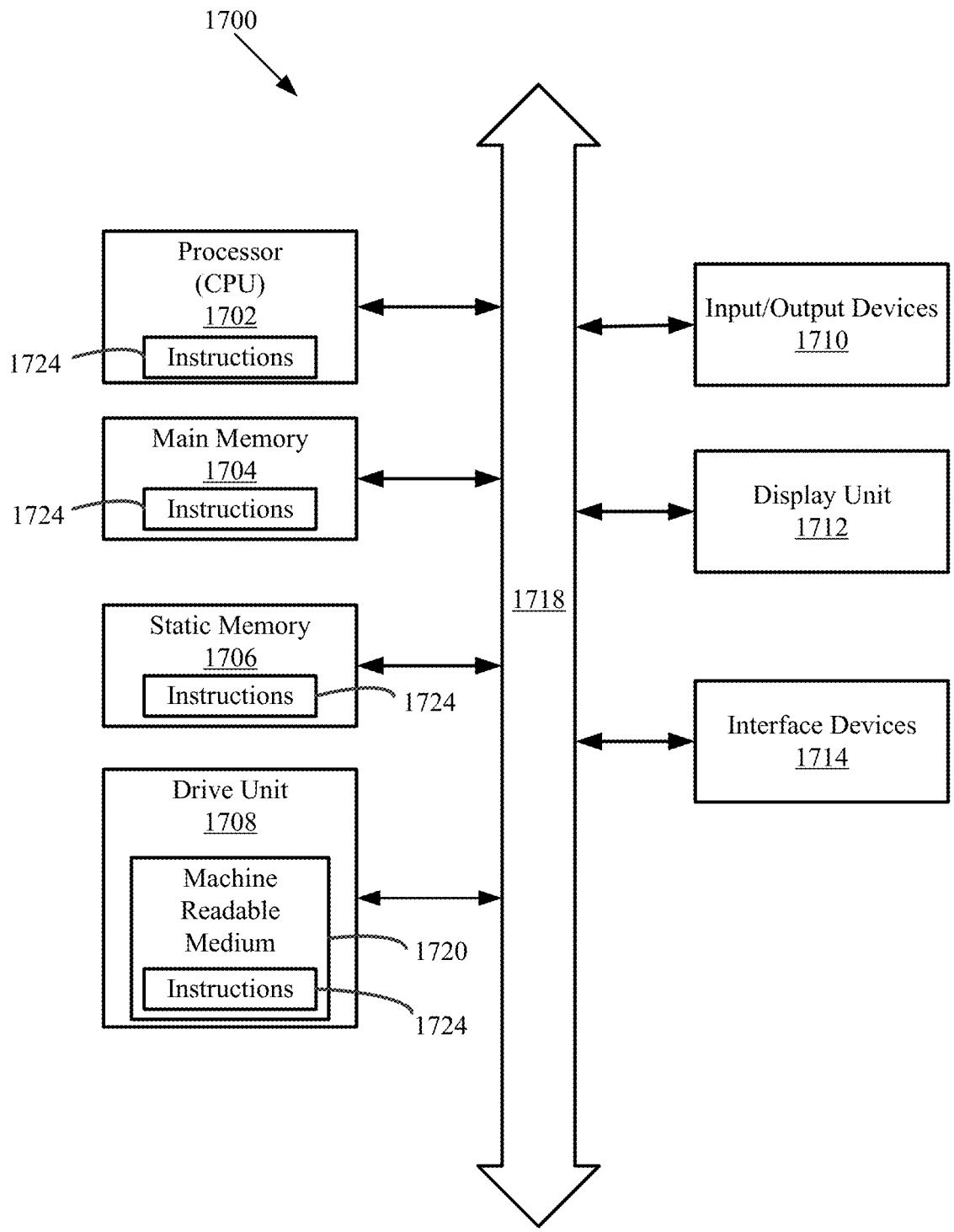
FIG. 17 provides an illustration of an architecture for a computing device.

Referring now to FIG. 17, there is shown a hardware block diagram comprising an example computer system 1700 that can be used for implementing all or part of the interference cancellation device 412 of FIG. 4. The machine can include a set of instructions which are used to cause the circuit/computer system to perform any one or more of the methodologies discussed herein. While only a single machine is illustrated in FIG. 17, it should be understood that in other scenarios the system can be taken to involve any collection of machines that individually or jointly execute one or more sets of instructions as described herein.

The computer system 1700 is comprised of a processor 1702 (e.g., a Central Processing Unit (CPU)), a main memory 1704, a static memory 1706, a drive unit 1708 for mass data storage and comprised of machine readable media 1720, input/output devices 1710, a display unit 1712 (e.g., a Liquid Crystal Display (LCD) or a solid state display, and one or more interface devices 1714. Communications among these various components can be facilitated by means of a data bus 1718. One or more sets of instructions 1724 can be stored completely or partially in one or more of the main memory 1704, static memory 1706, and drive unit 1708. The instructions can also reside within the processor 1702 during execution thereof by the computer system. The input/output devices 1710 can include a keyboard, a multi-touch surface (e.g., a touchscreen) and so on. The interface device(s) 1714 can be comprised of hardware components and software or firmware to facilitate an interface to external circuitry. For example, in some scenarios, the interface devices 1714 can include one or more Analog-to-Digital (A/D) converters, Digital-to-Analog (D/A) converters, input voltage buffers, output voltage buffers, voltage drivers and/or comparators. These components are wired to allow the computer system to interpret signal inputs received from external circuitry, and generate the necessary control signals for certain operations described herein.

The drive unit 1708 can comprise a machine readable medium 1720 on which is stored one or more sets of instructions 1724 (e.g., software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include solid-state memories, Electrically Erasable Programmable Read-Only Memory (EEPROM) and flash memory devices. A tangible medium as described herein is one that is non-transitory insofar as it does not involve a propagating signal.

Computer system 1700 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for mitigating an effect of interference in a receiver, comprising:
   receiving, by the receiver, a signal having a first interfering signal component;
   generating, by the receiver, a replicated signal of interest using known parameters;
   iteratively performing the following first stage operations by the receiver to obtain a plurality of first residual errors for the first interfering signal component:
   modifying an amplitude of the replicated signal of interest;
   obtaining a first reference signal by removing the replicated signal of interest with the modified amplitude from the received signal;
   analyzing the first reference signal to obtain an estimated carrier frequency and an estimated symbol rate for the first interfering signal component;
   generating a remaining signal by removing, from the first reference signal, a signal having the estimated carrier frequency and the estimated symbol rate; and
   determining a residual error of the remaining signal;
   setting refined parameters for the first interfering signal component equal to the estimated carrier frequency and the estimated symbol rate that are associated with a lowest one of the plurality of first residual errors.

2. The method according to claim 1, wherein the amplitude of the replicated signal of interest is modified by a different amount in each iteration of the first stage operations.

3. The method according to claim 1, further comprising:
   generating an estimated interfering signal using initial gross parameters for at least one second interfering signal component of the received signal;
   wherein the first reference signal is obtained by removing, from the received signal, the estimated interfering signal in addition to the replicated signal of interest.

4. The method according to claim 1, further comprising iteratively repeating the first stage operations for a second interfering signal component of the received signal, and setting refined parameters for the second interfering signal component based on results of the first stage operations.

5. The method according to claim 1, further comprising:
obtaining a second reference signal by removing at least the replicated signal of interest from the received signal;
iteratively performing the following second stage operations to obtain a plurality of second residual errors for the first interfering signal component:
generating an estimate of the first interfering signal component using the refined parameters which were previously set based on results of the first stage operations;
adjusting a symbol rate of the estimate of the first interfering signal;
analyzing the estimate of the first interfering signal to obtain a refined estimated carrier frequency for the first interfering signal component;
generating a resulting signal by removing, from the second reference signal, a signal having the refined carrier frequency and the symbol rate; and
determining a residual error of the resulting signal;
re-setting the refined parameters for the first interfering signal component equal to the symbol rate and the refined estimated carrier frequency that are associated with a lowest one of the plurality of second residual errors.

6. The method according to claim 5, wherein the symbol rate of the estimate of the first interfering signal is modified by a different amount in each iteration of the second stage operations.

7. The method according to claim 5, further comprising:
generating an estimated interfering signal using refined parameters for at least one second interfering signal component of the received signal;
wherein the second reference signal is obtained by removing, from the received signal, the estimated interfering signal in addition to the replicated signal of interest.

8. The method according to claim 5, further comprising iteratively repeating the second stage operations for a second interfering signal component of the received signal, and setting refined parameters for the second interfering signal component based on results of the second stage operations.

9. The method according to claim 1, further comprising:
obtaining a third reference signal by removing, from the received signal, the replicated signal of interest and at least one replicated interfering signal;
selecting a pulse shape from a plurality of pulse shapes;
iteratively repeating the following third stage operations to obtain a plurality of third residual errors for the first interfering signal component:
selecting a roll-off factor from a plurality of different roll-off factors;
generating an estimate of the first interfering signal component using the pulse shape, the roll-off factor and the refined parameters for the first interfering signal component;
determining a residual error between the third reference signal and the estimate of the first interfering signal component;
selecting a next pulse shape of the plurality of pulse shapes;
iteratively repeating the third stage operations using the next pulse shape; and setting filter parameters based on the pulse shape and roll-off factor that are associated with a lowest one of the plurality of the third residual errors.

10. A system, comprising:
a processor;
a non-transitory computer-readable storage medium comprising programming instructions that are configured to cause the processor to implement a method for mitigating an effect of interference in a receiver, wherein the programming instructions comprise instructions to:
receive a signal having a first interfering signal component;
generate a replicated signal of interest using known parameters;
iteratively perform first stage operations to obtain first residual errors for the first interfering signal component, the first stage operations comprising:
modifying an amplitude of the replicated signal of interest;
obtaining a first reference signal by removing the replicated signal of interest with the modified amplitude from the received signal;
analyzing the first reference signal to obtain an estimated carrier frequency and an estimated symbol rate for the first interfering signal component;
generating a remaining signal by removing, from the first reference signal, a signal having the estimated carrier frequency and the estimated symbol rate; and
determining a residual error of the remaining signal;
set refined parameters for the first interfering signal component equal to the estimated carrier frequency and the estimated symbol rate that are associated with a lowest one of the first residual errors.

11. The system according to claim 10, wherein the amplitude of the replicated signal of interest is modified by a different amount in each iteration of the first stage operations.

12. The system according to claim 10, wherein the programming instructions further comprise instructions to generate an estimated interfering signal using initial gross parameters for at least one second interfering signal component of the received signal, and the first reference signal is obtained by removing, from the received signal, the estimated interfering signal in addition to the replicated signal of interest.

13. The system according to claim 10, wherein the programming instructions further comprise instructions to iteratively repeating the first stage operations for a second interfering signal component of the received signal, and setting refined parameters for the second interfering signal component based on results of the first stage operations.

14. The system according to claim 10, wherein the programming instructions further comprise instructions to:
obtain a second reference signal by removing at least the replicated signal of interest from the received signal;
iteratively perform second stage operations to obtain second residual errors for the first interfering signal component, the second stage operations comprising:
generating an estimate of the first interfering signal component using the refined parameters which were previously set based on results of the first stage operations;
adjusting a symbol rate of the estimate of the first interfering signal;

analyzing the estimate of the first interfering signal to obtain a refined estimated carrier frequency for the first interfering signal component;

generating a resulting signal by removing, from the second reference signal, a signal having the refined carrier frequency and the symbol rate; and determining a residual error of the resulting signal;

re-set the refined parameters for the first interfering signal component equal to the symbol rate and the refined estimated carrier frequency that are associated with a lowest one of the second residual errors.

15. The system according to claim 14, wherein the symbol rate of the estimate of the first interfering signal is modified by a different amount in each iteration of the second stage operations.

16. The system according to claim 15, wherein the programming instructions further comprise instructions to generate an estimated interfering signal using refined parameters for at least one second interfering signal component of the received signal, and the second reference signal is obtained by removing, from the received signal, the estimated interfering signal in addition to the replicated signal of interest.

17. The system according to claim 15, wherein the programming instructions further comprise instructions to iteratively repeat the second stage operations for a second interfering signal component of the received signal, and set refined parameters for the second interfering signal component based on results of the second stage operations.

18. The system according to claim 10, wherein the programming instructions further comprise instructions to:

obtain a third reference signal by removing, from the received signal, the replicated signal of interest and at least one replicated interfering signal;

select a pulse shape from a plurality of pulse shapes;

iteratively repeat third stage operations to obtain third residual errors for the first interfering signal component, the third stage operations comprising:

selecting a roll-off factor from a plurality of different roll-off factors;

generating an estimate of the first interfering signal component using the pulse shape, the roll-off factor and the refined parameters for the first interfering signal component;

determining a residual error between the third reference signal and the estimate of the first interfering signal component;

select a next pulse shape of the plurality of pulse shapes;

iteratively repeating the third stage operations using the next pulse shape; and set filter parameters based on the pulse shape and roll-off factor that are associated with a lowest one of the third residual errors.

\* \* \* \* \*